Dec. 23, 1941.  G. A. RUBISSOW  2,267,171
ANTIVIBRATION MEANS FOR ACCELERATOR PEDALS
Filed June 19, 1939    2 Sheets-Sheet 1

INVENTOR
George A. Rubissow

Dec. 23, 1941.  G. A. RUBISSOW  2,267,171
ANTIVIBRATION MEANS FOR ACCELERATOR PEDALS
Filed June 19, 1939   2 Sheets-Sheet 2
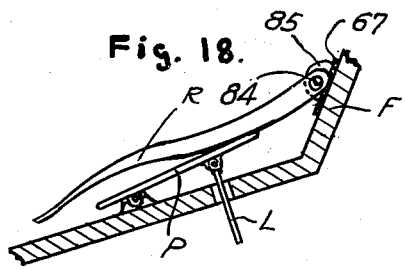
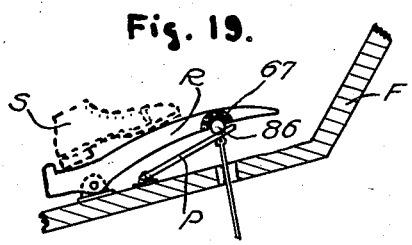
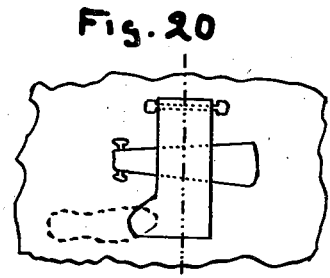
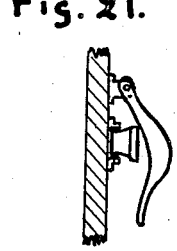
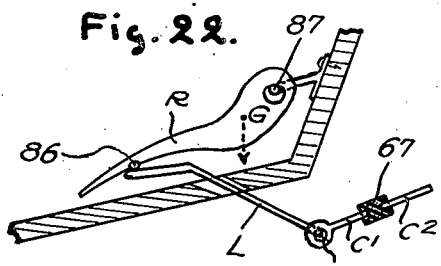
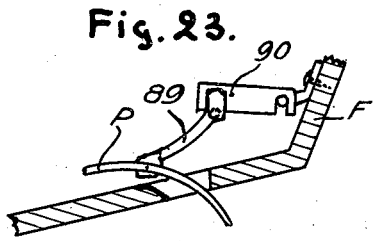
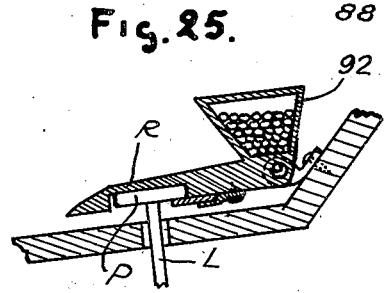
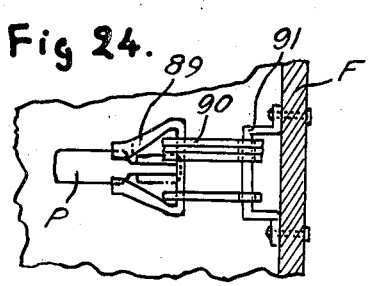
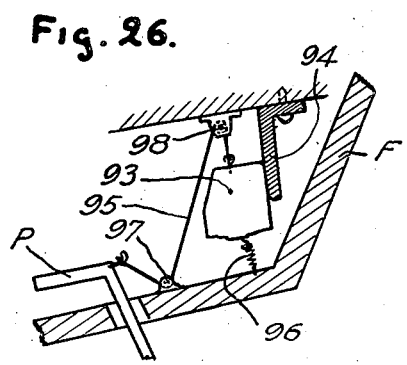
INVENTOR
George A. Rubissow.

Patented Dec. 23, 1941

2,267,171

UNITED STATES PATENT OFFICE 2,267,171

ANTIVIBRATION MEANS FOR ACCELERATOR PEDALS

George A. Rubissow, New York, N. Y.

Application June 19, 1939, Serial No. 279,896

4 Claims. (Cl. 74—513)

It is known that all existing types of throttle pedals for actuating an internal combustion engine of an automobile are provided with urging devices such as springs which enable the throttle after it has been released by the foot to return to its neutral so-called ticking-over position. When operating such a throttle, the driver's foot constantly exerts muscular pressure thereon, which pressure must be maintained so long as the throttle is in an actuating position. Hence the foot is constantly under muscular tension with resultant very annoying fatigue. This is especially important where long periods of driving are necessary. Many ailments of the muscles and of sciatic nerves are caused by such arrangements of the throttle.

Another inconvenience is the irregularity of many roads which has an influence on the impact weight of the foot and causes vibrations and jerks of the throttle.

The present invention eliminates by means of a very simple, economical device, not only foot fatigue but also most of the jerks and vibrations of the accelerator device, and may be mounted on any existing type of throttle, or made in the form of a new throttle pedal adaptable to the existing system of acceleration.

In all existing accelerating systems, manufacturers of throttle pedals make them as light in weight as possible. They also attempt to make the reactional restoring force of such throttle pedals as slight as possible within the bounds of safety.

The light weight of such modern throttle eliminates automatically to a large extent the impact action of such throttle and, therefore, the weight of the foot and its own impact dominate the impact of the throttle.

This invention consists in providing throttles of very heavy weight as compared with the existing weights of the same, which weight considerably increases their impact action.

One aspect of this invention consists in adding an additional weight to the existing throttle on its top or on its bottom or any other suitable place on the rods or levers of the throttle system.

Another aspect consists in providing special heavy members adaptable to the shoe of the driver or replacing the same, which the driver will wear for use on the existing type of throttle pedal.

Another aspect resides in providing heavy levers pivotally attached in respect to the floor or to the walls of the automobile. The free end of the levers rests freely on the upper surface of the throttle pedal so that the foot, instead of pushing the throttle, pushes the said lever, providing by its own weight the very important new impact used as amortizer or neutralizer of any irregularities of the throttle actuating device.

The above and further objects and novel features will more fully appear from the following detailed description when the same is read in connection with the accompanying drawings. It is to be expressly understood, however, that the drawings are for purposes of illustration only and are not intended as a definition of the limits of the invention.

All figures represent the different aspects of the invention in simplified and diagrammatical form of illustration.

In the drawings, wherein like reference characters refer to like parts throughout the several views:

Figures 18 and 19 are cross-sectional views of a device in the form of an independent pivotal lever.

Figure 20 is a plan view of a pivotal lever arrangement of the device.

Figure 21 is a cross-section of Figure 20.

Figure 22 is another pivotal lever arrangement, partly in cross-section.

Figure 23 is a lever device with adjustable weights, partly in cross-section.

Figure 24 is a plan view of Figure 23.

Figure 25 is a cross-sectional view of the pivotal lever device combined with a device with adjustable weight.

Figure 26 is a diagrammatical view, partly in cross-section, of a device actuated by a weight attached to the throttle by a flexible connection and passing through appropriate guideways.

Figure 1:
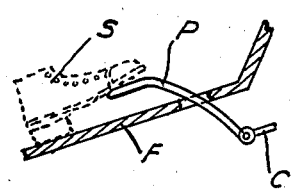
Figure 1 is a side view, partly in cross-section of the existing type of throttle without the application of this invention.
Figure 2:
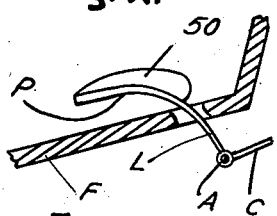
Figure 2 is a side view in cross-section of one aspect of the invention.

One aspect of this invention is clearly illustrated in Figure 2, wherein the throttle pedal P, articulated around an articulation A, has an additional member 50, of heavy weight, rigidly affixed on the top of the said pedal P. The said member of heavy weight will be signified as "weight" or "W." The weight 50 may be soldered or glued or affixed with bolts, screws, bands, wires, etc. It may also form one piece with the pedal, for which purpose, this pedal P should, when cast or stamped, be molded to effect this. The weight 50 should be sufficiently large so that the pedal P and the weight 50 together will have such an impact that it will amortize most if not all of any vibrations, jerks, etc., of the accelerator system, communicated through the lever to the pedal P.

Figure 3:
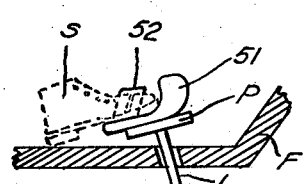
Figure 3 is a side view in cross-section of a device adaptable on the shoe.

In Figure 3 is shown another aspect of this invention, wherein the weight W constitutes a separate weight 51 not attached on the pedal P but arranged in such a form that it may be mounted as a separate member on the shoe of the driver by suitable fixation means. The weight 51 may be of any desirable form, flat or curved, with or without arresting means and of any desirable weight suitable for the accelerator system. One aspect of the fixation means is shown in the form of a band 52 which may be adjustable or be provided with buckles or clips.

When the impact force of weight 50 in Figure 2 or of the weight 51 in Figure 3 or the impact force of any of the other embodiments described herein is in action, all vibrations, jerks, etc. will be greatly diminished because the impact of the said weight W acts as an amortizer of the said jerks, vibrations, and the like.

Figure 4:
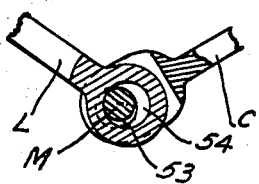
Figures 4 and 5 show a link connection in side view and in plan view, both partly in cross-section.
Figure 5:
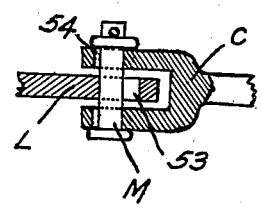

To improve the operation of the device, it can be recommended in many instances, that the existing link connection be replaced by one similar to that shown in Figures 4 and 5, wherein the levers L and C are both provided with an opening 53 and 54, the diameter of each opening to be much larger than the diameter of the lever axle M. In its present form, the existing link connection permits no free play between the axles and the bearings in which the axles rotate.

The openings, instead of being circular, may be of any other form and may be so arranged that their heights for example will be equal to the diameter of M, but their lengths will be much greater than the diameter of M. Such an arrangement will permit weight W, having a greater impact than the adjacent levers of the throttle system, to respond much more slowly to vibrations, jerks, etc., caused by the accelerating system, and in consequence of which the free spaces provided between M and the openings 53 and 54 will permit a certain additional amortization of the said vibrations, etc. Another arrangement may be used for the said link connection between L and C, in which the bearings wherein the axle M pivots may be surrounded by elastic or semi-elastic means, such as rubber, cloth, and the like, to amortize a certain amount of the vibrations and the like. These rubber mountings are not shown in the drawings. The linkage as shown diagrammatically in Figures 4 and 5, may be simplified when the axle M forms one rigid body with the lever C or is mounted rigidly to the axle C through the intermediary of a rubber cushion surrounding a part of the said axle, where it passes through the openings 54.

The same linkage as shown in Figures 4 and 5, instead of being interposed between L and C may be interposed in one or more of the connections of all other levers from the accelerator to the throttle pedal.

Figure 6:
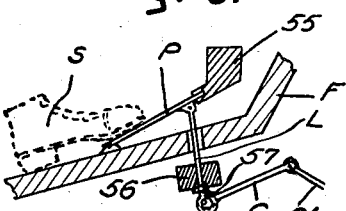
Figure 6 is a side view, partly in cross-section of an existing throttle provided with one aspect of the invention.
Figure 7:
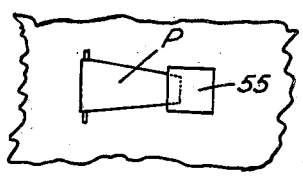
Figure 7 is a plan view of Figure 6.

Another embodiment of this invention is shown in Figures 6 and 7, wherein the weight 55 is mounted rigidly on the end of the pedal P and the lever L is itself provided with another additional weight 56 rigidly or movably affixed to it by fixation means 57 in which form both weights, 55 and 56, cooperate with each other. If desired, 55 may be eliminated and only the weight 56 would remain. Weights similar to 56 may be affixed in appropriate parts of other levers of the system, for instance, on the lever C or $C_1$ of Figure 6.

Generally speaking, it is recommended to use a very heavy material, such as lead, because of its lack of elasticity, very heavy specific weight and cheap price. But any other heavy material or alloy may be used.

Figure 8:
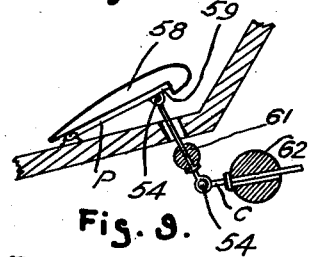
Figure 8 is a side view, partly in cross-section, of another aspect of the invention.
Figure 9:
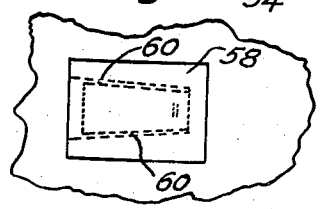
Figure 9 is a plan view of Figure 8.

Another aspect of this invention is to provide an existing throttle with additional weight W, which is not rigidly attached to the throttle pedal but rests or lies on it and can be moved in one or more directions or planes in respect to the surface on which it lies. Such an arrangement is shown in Figures 8 to 14 inclusive, as well as in Figures 16 and 17. In Figures 8 and 9, the weight 58 is made of lead or other heavy material and is placed adjacent to the pedal P. It touches the same on its upper surface as well as on its upper end 59. Free spaces 60 are left on the sides. The weight 58, thus, responds to its own harmonic and possesses its own impact, other than same harmonic and impact of the pedal P. In case pedal P comes back to the position where it is adjacent to the weight, it will then amortize its own movement by the impact of the weight 58. In the case, for instance, that pedal P is forced to move upwards, i. e., to raise the weight, pedal P will have to overcome the impact of the weight 58, which will cause a considerable amortizing action. If, in addition to this, the linkage 54 between the lever L and the pedal P will be provided with soft rubber interposed between the contact surfaces of the upper axis of the lever L and the pedal P, then a part of the vibrations will also be amortized by this rubber mounting before actually being communicated to the latent weight 58.

If desired, the weight 58 may be assisted by weights 61 ($W_1$) and 62 ($W_2$) mounted on L and on C, loosely or rigidly and acting in the same way as described for 58.

The choice of the weight W, with or without assistance of the additional weights ($W_1$, $W_2$ . . .) in all the cases where it must be used in conjunction with the throttle pedal should be so chosen that the reaction of the pedal will be considerably diminished but will still remain sufficient to remove the throttle from an operative position into a non-operative ticking-over position.

If the reaction of the throttle on the end of the pedal is, for instance, and by way of example only, 8 pounds, the weight may be chosen so that it would diminish this reaction of 8 pounds as desired, i. e., to 4 pounds, 2 pounds, 1 pound, depending on the driver's preference.

When using this device for eliminating the vibrations of mechanical parts other than the throttle, such as, for instance, the pneumatic hammer or perforator, the choice of the weight (W) or (W+$W_1$+$W_2$...) is much less limited because there will be no necessity of a restoring force to be maintained continuously as is the case with an automobile throttle pedal.

Figure 10:
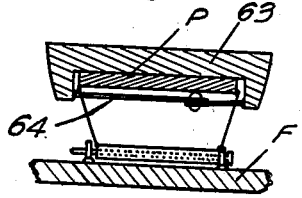
Figure 10 is the side view of the device in a cross-section perpendicular to the longitudinal symmetry axis of the throttle.
Figure 11:
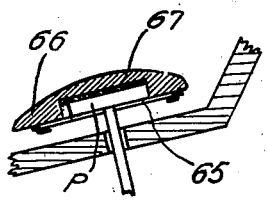
Figures 11 and 12 are side views, partly in cross-section, of the device showing its mounting on the throttle.

On Figure 10 is shown in enlarged size how the weight 63 of a device similar to that shown on Figures 8 and 9 is held by attaching means 64, which means prevents it from jumping from the pedal. This means 64 may be flexible or made of metal or in the form of a chain; it may be adjustable or made of elastic means 65 (Figure 11) in the form of a band of rubber, slightly tightened below the weight 66.

Figure 12:
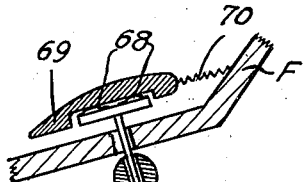

Between the weight 66 and the pedal P, there may be interposed intermediary dampening means 67, which may be made of rubber, sponge rubber or of cloth or other shock-absorbing materials such as cotton batting and the like. It may also be replaced by springs 68 as shown in Figure 12.

The weight 69 (Figure 12) may also be mounted so that it is attached by means of a suitable flexible connection 70 to the flooring F. This flexible connection 70 may be a band, rubber, or even a spring. It may also be made of metal strips or wires. In other cases, it will be found advantageous to have it made of materials having very low elasticity, such as strips or wires of lead, or copper covered with lead.

Figure 13:
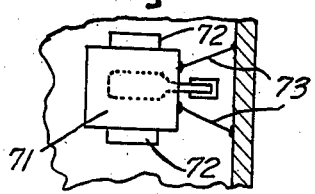
Figure 13 is another aspect of the device in plan view with its mountings.

In Figure 13 is shown how the weight 71, resting freely on the pedal, is held in position by means of a flexible connection 72, affixed on its sides, and is held from being deposed by means of a flexible connection 73. Said flexible connections may be made of various materials, such as designated for 70, 65, or for 64.

Figure 14:
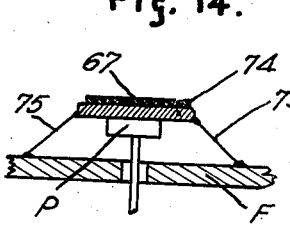
Figure 14 is a cross-sectional view perpendicular to the symmetry axis of the throttle and of another aspect of the device and mounting.

In Figure 14 the weight 74 is maintained in its inoperative position on the pedal P by means of elastic connection 75, attached to it and to the said elastic connection pulling slightly downward the pedal and the weight 74. The weight is covered with dampening means 67 (as described for Fig. 11) on which the driver's shoe rests when in operation.

Figure 15:
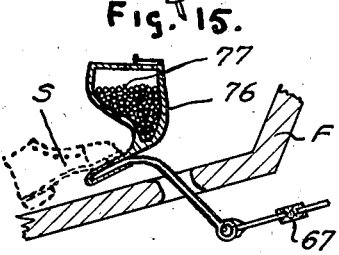
Figures 15 and 16 are cross-sectional views of a device having adjustable weight facilities.

This invention also provides a weight W which may be adjusted to the driver's comfort in order to compensate in whatever proportion desired—great or small—for the reaction of the throttle pedal. If the weight is rigidly affixed on the pedal, the weight device may have different forms; for instance, as shown in Figure 15, wherein the device 76 has a hollow body which can be filled with the appropriate amount of small pieces of lead 77, buckshot or other heavy material. The amount determined by the driver, should be so chosen that it compensates for the reaction of the throttle by the weights 76 and 77.

Figure 16:
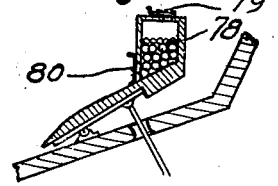

In Figure 16 another embodiment of a hollow device 78 is combined with the weight resting on the pedal. The buckshot may be inserted through an opening 79 provided with a small sliding top. If too much is put in, an opening 80 may be provided with a similar sliding top to remove the excess.

Figure 17:
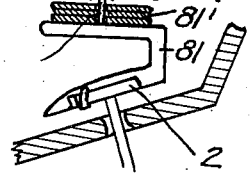
Figure 17 is another device in cross-section with an adjustable weight.

In Figure 17 the adjustable weight is arranged in form 81 and it is controlled by means of plates $81^1$, a desirable number of which are put on the rod 82 and affixed by fixation means 83.

Another aspect of this invention consists in arranging in the proximity of the pedal a pivoting weight W, in the form of a lever-like member, made of very heavy material. One embodiment of such arrangement is shown in Figure 18, wherein the lever R is attached by its one end on the pivoting axle 84 to the wall of the flooring F by fixation means 85, while its other part rests on the pedal. The weight is thereafter actuated by the foot in the same way as the throttle-pedal, but owing to the great impact of the weight, it will produce an amortizing and neutralizing effect against the vibrations, jerks and the like of the pedal P. The lever R may have any desired form. It may be made of one or several pieces or form a hollow body filled with small pieces of heavy material, such as lead, buckshot, and the like. A pivoting articulation 84 may be mounted loosely as described in Figures 4 and 5, with or without rubber mounting interposed between the pivoting axle, and the bearings or between the fixation means 85 and the wall of the flooring.

In Figure 19 another arrangement of a similar pivoting lever is shown, to receive the complete shoe thereon with abutments provided therefor. In Figure 18, the center of gravity of the lever R may be chosen according to the effect which it is desired to obtain. In Figure 19 the lever R, when assisted by the weight of the foot and shoe S, may have the center of gravity so chosen that the most favorable amortizing action will be effected. Between the lever R and the pedal P, there may be interposed a roller 86 to diminish the frictional engagement during the operation. This roller may be mounted in a bearing 86, between which bearing and the lever R may be interposed an elastic means 67. In Figures 20 and 21 is shown a lever arrangement mounted on the side in respect to the symmetry axis of the pedal.

In Figure 22 there is shown another form of a lever R, wherein the center of gravity is intentionally moved very close to the pivoting axle by a proper choice of the distribution of the mass. Furthermore, the linkage is a loose one; i. e., the pivoting axles 87 and 88 are mounted in bearings with abnormally enlarged diameters. The lever C is provided with elastic shock-absorbing means 67, interposed between $C_1$ and $C_2$.

In Figures 23 and 24, the pedal P is provided with a rigid element 89 on which rests freely the weights 90 pivotally attached on an assembling rod 91 affixed to the wall of the flooring F. The choice of the heaviness of the weight element enables the balancing of the reaction of the throttle pedal to the desired degree.

In Figure 25 is shown a combination of lever arrangement as in Figure 18 having a hollow body 92 filled with the necessary quantity of buckshot.

In Figure 26 another aspect of the device is shown in the form of a weight 93 assisted by guideways 94 which weight is suspended on a flexible connection 95, which passes through guide means or rollers 96 and 97 and is attached by its other end to the pedal P. The weight 93 may furthermore be assisted by an elastic connection 96 which draws it towards the wall of the flooring F and holds it in the necessary position.

All the described aspects of the invention work substantially on the same general principle and form one subject of the invention.

This device may be used not only for accelerating pedals of automobiles or airplanes but also for any other pedals, such as brake pedals, trolley pedals, electric car pedals, different railroad machine actuating pedals.

The same device may also be used for several tools, such as drills, pneumatic hammers or other machines necessitating bodily contact either manually or by foot, etc., one or several parts of a machine having jerks, vibrations or the like. Different types of embodiments of corresponding devices made on the principle as described herein may be used therefor advantageously.

Having now particularly described and ascertained the nature of my said invention and in what manner the same is to be performed, I declare that what I claim is:

1. A vibration diminishing device of a foot-operated pedal of a vehicle, comprising a member having a heavy weight, said member rests on the upper surface of the said pedal, means to secure freedom for slight movement of said member in respect to the said pedal, means for preventing the said member from being knocked off the said pedal.

2. A vibration diminishing device of a foot-operated pedal of a vehicle, comprising a member having a heavy weight, said member rests on the upper surface of the said pedal, means to secure freedom for slight movement of said member in respect to the said pedal, means for preventing the said member from being knocked off the said pedal, resilient means interposed between at least one part of the lower surface of the said member and the upper surface of the said pedal, whereby the vibrations of the said pedal are substantially absorbed before being transmitted to the said member.

3. A vibration diminishing device of a foot-operated pedal of a vehicle, comprising a member having a heavy weight, said member rests on the upper surface of the said pedal, means to secure freedom for slight movement of said member in respect to the said pedal, means for preventing the said member from being knocked off the said pedal consisting of a flexible connection, one end of which is attached rigidly in respect to the flooring, and its other end is attached to the said member, whereby the said member is held in its limited freely movable position during the operation of the said pedal.

4. A vibration diminishing device of a foot-operated pedal of a vehicle, comprising a member having a heavy weight, said member rests on the upper surface of the said pedal, means to secure freedom for slight movement of said member in respect to the said pedal, means for preventing the said member from being knocked off the said pedal consisting of an elastic connection, one end of which is attached rigidly in respect to the flooring, and its other end is attached to the said member, whereby the said member is held in its limited freely movable position during the operation of the said pedal.

GEORGE A. RUBISSOW.